A. C. KETCHUM.
Potato-Digger.
No. 3,442. Patented Feb. 20. 1844.
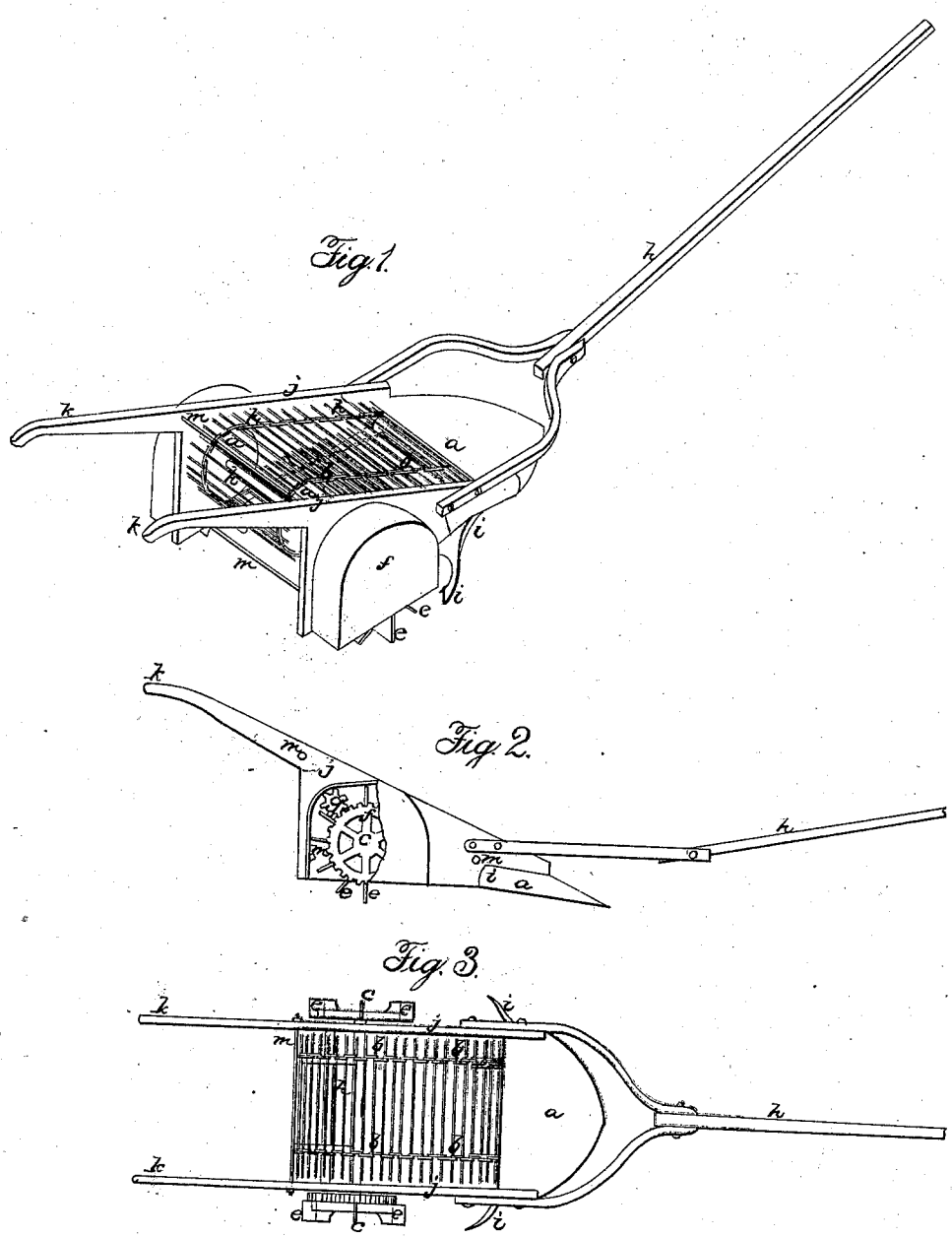

UNITED STATES PATENT OFFICE.

ARCHIBALD C. KETCHUM, OF SCHENECTADY, NEW YORK.

IMPROVEMENT IN POTATO-DIGGERS.

Specification forming part of Letters Patent No. 3,442, dated February 20, 1844.

*To all whom it may concern:*

Be it known that I, ARCHIBALD C. KETCHUM, of Schenectady, in the county of Schenectady and State of New York, have invented a new and useful Machine for Digging Potatoes; and I do hereby declare that the following is a full, clear, and exact description of the construction and operation of the same, reference being had to the annexed drawings, making part of this specification, in which—

Figure 1 is a perspective view. Fig. 2 is a longitudinal elevation, and Fig. 3 is a bird's-eye view.

The same letters refer to the same parts in all the drawings.

$a$ is the iron share, which, passing under the hills, plows up the potatoes together with the surrounding soil, the whole, as the machine progresses, being forced back upon the endless belt of iron rods $b\ b$, by which the potatoes are screened and cleared from the dirt adhering to them, and are thrown off at the tail of the machine.

$c\ c$ are wheels, so attached to their axle that the latter revolves with them, carrying round the sprockets $d\ d$, from which the endless belt $b\ b$ derives its motion. In order to insure the turning of the wheels $c\ c$, projecting irons $e\ e\ e$, which I call "paddles," are attached to their circumference, which, entering the ground, force the wheels to revolve as the machine advances.

$f$ is a spur-wheel fixed upon the same shaft as the wheels before mentioned, driving the pinion $g$, which turns the shaft $h$, bearing the sprockets $d\ d$, thus giving motion to the endless belt of iron rods $b\ b$.

$i\ i$ are curved earth-boards, which serve to clear a path before the wheels.

$j\ j$ are the sides, which may be of wood or iron, and $k\ k$ are the handles by which the machine is guided.

$l$ is a box covering the gearing, to protect it from the dirt. $m\ m$ are iron rods connecting the two sides.

$n$ is the perch or tongue, to which the cattle are attached.

What I claim as my Invention, and desire to secure by Letters Patent, is—

The combination of a share, which serves to unearth the potatoes, with an endless revolving belt or chain, serving to screen and separate them from the soil.

A. C. KETCHUM.

Witnesses:
 WM. S. ELLISON,
 M. F. T. SWINTON.